June 24, 1941.  W. E. GARITY ET AL  2,246,796
APPARATUS ADAPTED FOR SCORING AND RERECORDING SOUND
Filed July 31, 1940  2 Sheets-Sheet 2
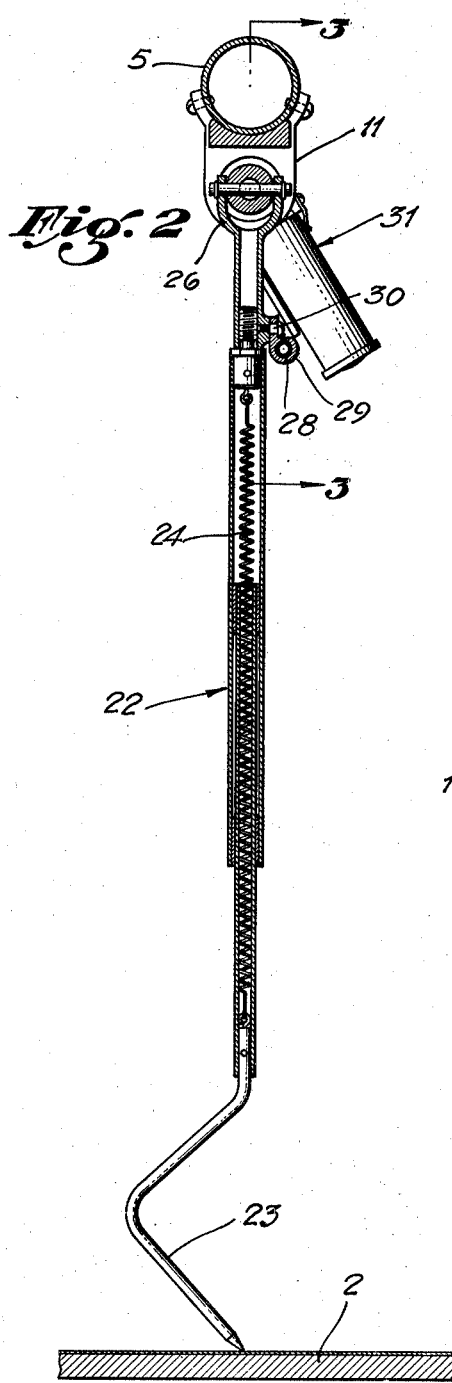
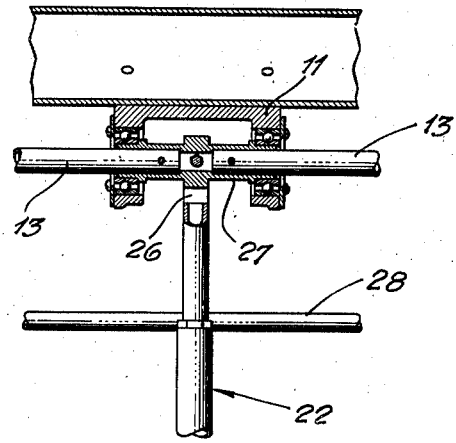
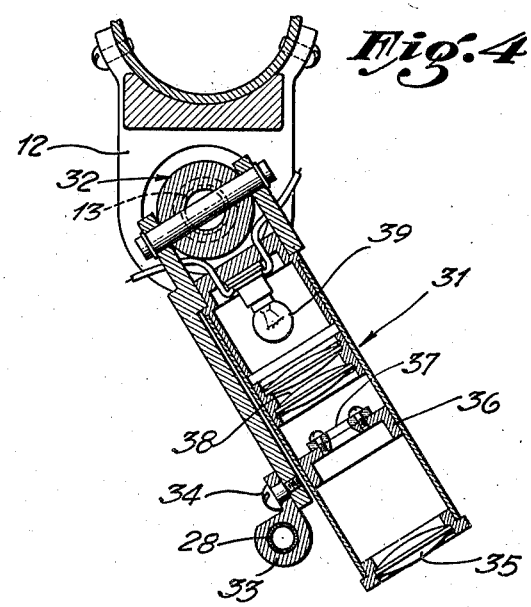
WILLIAM E. GARITY and
JACKSON G. KUHN,
INVENTORS;
BY
ATTORNEY.

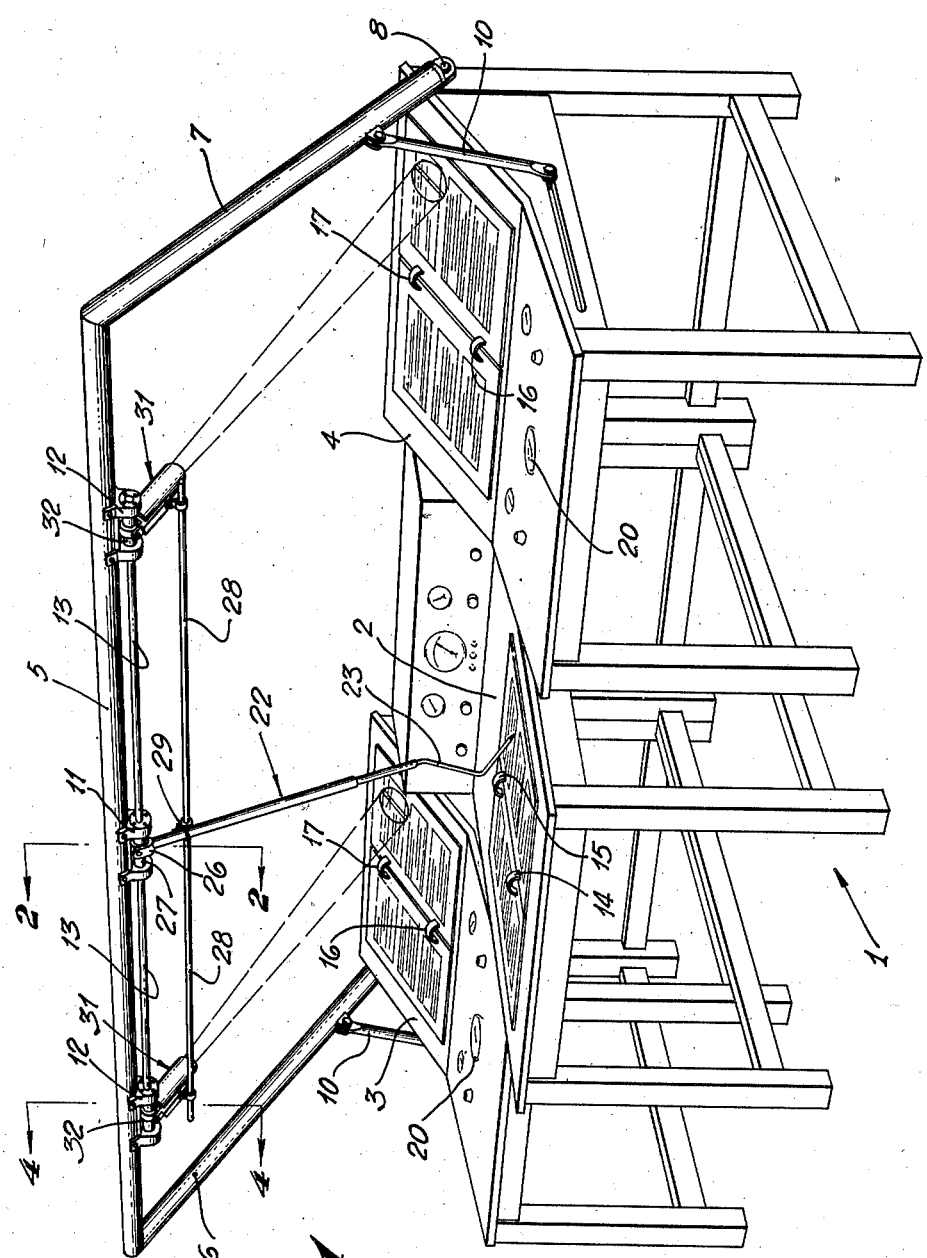

Patented June 24, 1941

2,246,796

UNITED STATES PATENT OFFICE 2,246,796

APPARATUS ADAPTED FOR SCORING AND RERECORDING SOUND

William E. Garity, Los Angeles, and Jackson G. Kuhn, Glendale, Calif., assignors to Walt Disney Productions, Burbank, Calif., a corporation of California Application July 31, 1940, Serial No. 348,617

10 Claims. (Cl. 179—100.1)

This invention pertains to devices for use in the rerecording of sounds, particularly dialog, music effects and other sounds used as an accompaniment to motion pictures.

In the production of photoplays and animated cartoons, many instances occur where it is desirable to record various sounds upon separate pieces of film or on separate recordings and then later assemble or combine these various sound recordings into a master recording from which prints are made to accompany the completed photoplay or animated cartoon. For example, the voice recordings such as dialog or song of the characters in the photoplay or cartoon film may be recorded upon one or more individual strips of film, each film containing one or more strips or lines of sound recording. The musical accompaniment may be recorded upon a separate strip of film; off-stage sounds and other sound effects may be recorded upon a third strip of film. Animal voices or off-stage dialog may be recorded upon a different strip of film. After the picture is completed, it is desirable to combine these various independent sound recordings into a master recording. The level or amplitude of these independent sound recordings may not be complementary. For example, the voice recording, such as dialog, may be at a level which is too low and when an attempt is made to combine such dialog with the background music, the background music drowns out the dialog and renders it impossible of understanding. During the rerecording procedure, it is necessary to manipulate numerous controls for the purpose of modulating the output of the separate tracks or sound recordings so as to strike a pleasing balance in which the background music is not too pronounced, the dialog is understandable and still not overly loud and the sound effects are distinguishable but perhaps do not drown out the other sounds which it is desired to have present.

The present device comprises an arrangement of elements which permits the musicians, assistant directors and directors of a photoplay or animated cartoon to positively follow the progress of the picture, the musical score and dialog and analyze the volume characteristics and timing of the various sound effects and other component parts of the final recording so that proper cues and adjustments in amplitude, location and position of the sounds may be noted and followed during a rerecording session. In a rerecording session the various independent sound tracks are reproduced simultaneously, the output of the reproducing pick-ups being sent to loud speakers which render the sounds audible, a portion of the same output also going to a recording machine in which a single composite record is made of all of the sounds upon a single track. Occasionally, during such rerecording procedure, the loud speakers reproduce all of the tracks but a new sound recording is made of each sound track, such new sound tracks containing or embodying modifications in volume, frequency modulation, or the like. By "frequency modulation," reference is made to the so-called "futzing" in which high or low frequencies are eliminated or in which certain bands of frequencies are either emphasized or diminished in order to produce a desired effect.

The device of the present invention comprises a work table provided with fixed holding means on which a musical score or other sheet material adapted to receive facsimiles of musical score containing control marks or indices is placed. A plurality of stations provided with such holding means is provided, the number of stations generally being equal to the number of independent mixing panels which are being handled in rerecording. The device is also provided with a pantograph or parallel linkage controlled by a scribe or stylus pivotally suspended from an overhead frame, such scribe or stylus being adapted to follow a master musical score. The pantograph or parallel linkage is connected to a plurality of projectors, such projectors being positioned immediately above the holding means so that the musical scores or other indexing means held by each holding means is within the field of travel of a projector. The work areas, including the various holding means, lie in planes which are tangent to the axis of suspension of the scribe and projectors so that there is a minimum amount of distortion and the precise location of the scribe upon the master musical score is indicated on a plurality of separate music scores or rerecording cue sheets on the various work areas of the table at all times. Each operator at each work area is thus fully informed as to the precise position (with respect to time and the master musical score) at each instant during the rerecording session or a rehearsal thereof, and proper notations as to modulation, changes in amplitude, futzing and the like may be made on each operator's score or cue sheet.

An object of the present invention, therefore is to disclose and provide an apparatus adapted to facilitate and expedite the work of rerecording from a plurality of individual records.

Other objects of the invention will become apparent to those skilled in the art from the following detailed description of an illustrative form of the invention.

In order to facilitate understanding, reference will be had to the appended drawings, in which:

Fig. 1 is a perspective view of the apparatus.

Fig. 2 is an enlarged section of the pointer.

Fig. 3 is an enlarged rear view of a portion of the apparatus, a portion being a section along III—III of Fig. 2.

Fig. 4 is an enlarged vertical section taken along plane IV—IV of Fig. 1.

As shown in the drawings, the device comprises a table, generally indicated at 1, provided with a plurality of work areas such as, for example, the work area 2 and the inclined work areas 3, 4, and the like. A frame member 5 extends above the surface of the table 1 and is provided with the arms 6 and 7 which may be pivotally attached to the sides of the table 1 as indicated at 8. Locking means may be provided for holding the frame member 5 in position above the table, such locking means being releasable so as to permit the frame 5 to be swung into position beneath the table and out of the way of the operators when it is not needed. Any suitable releasable locking means may be used, a very simple form being shown in the drawings and comprising the means 10. The frame 5 may carry a plurality of spaced yokes 11, 12 and the like, adapted to receive and rotatably hold a pivot shaft 13 lying in a plane parallel to the plane of the work areas of the table 1.

The work area 2 may be in a horizontal or sloping plane, the center thereof being immediately beneath the pivot shaft 13. This work area, adapted to be the control area, is provided with holding means such as the rings 14 and 15 adapted to receive the leaves of a master musical score. The other work areas, such as the work areas 3 and 4, may lie in planes inclined to the plane of the work area 2 but all of the areas 3 and 4 lie in planes which are tangent to a circle or cylinder having the pivot shaft 13 as its axis.

The work areas 3, 4 and the like are also provided with suitable holding means, such as the rings 16 and 17 adapted to receive and removably hold the leaves of music scores or cue sheets adapted to receive notations as to cues and the like. In the drawings it will be seen that the work areas 3 and 4 are towards the back of the table 1. The space immediately in front of these work areas 3 and 4 is adapted to receive and contains instrument panels, generally indicated at 20, each instrument panel containing equipment capable of being used by the operator at such work areas in changing the volume and other characteristics of the sound record being reproduced or rerecorded. For example, the instrument panel 20 may contain volume indicators, footage indicators, variable attenuators, band filters, theatre volume controls, futzer controls, and the like.

Suspended from the pivot shaft 13 is a scribe or stylus 22 preferably made of tubular stock and having a substantially straight body portion and an inclined lower portion indicated at 23. The point of this scribe at the lower end of the portion 23 is preferably in line with the axis of the body portion 22. The lower portion 23 may be slidable within the tubular body portion 22 and such body portion 22 may contain a spring 24 adapted to prevent the portions 22 and 23 from falling apart and still capable of permitting adjustment in the total length of the scribe by manual operation of the lower portion 23.

The upper end of the scribe 22 is provided with a U-shaped yoke 26 pivotally attached to a sleeve 27 rotatably held in bearings carried by the downwardly extending arms of the yoke 11. The pivot shaft 13 may be made in sections, such sections fitting into the sleeves 27. The scribe 22 may be moved in any desired direction. A parallel linkage 28 extends above the table 1 and parallels the pivot shafts 13. This parallel linkage 28 is connected to the scribe 22 as at 29 by means of a pivot screw 30.

Immediately above the mid point of each of the work areas 3, 4 and the like, is a projector 31 pivotally connected to a rotatable sleeve 32 journaled in the downwardly depending arms of the yoke 12. Each of these projectors 31 is connected by means of a collar 33 and a pivot screw 34 to the parallel linkage bar 28. One of such projectors is shown in considerable detail in Fig. 6 and as there shown may include a lens 35, a screen holder 36, a screen plate 37, a condenser lens in a removable holder 38, and a light source 39. The screen 37 may be made of translucent material, either sanded or inherently translucent, such screen being provided with a narrow transverse slot, the axis of the slot being transverse to the pivotal axis of the pivot shaft 13. The arrangement of lenses (condensers and objective) should be such as to throw a spot of light upon the work sheets carried by the work areas 3, this spot of light being sufficiently subdued so as to permit the operator to look at the area illuminated by said spot and upon a projection screen in a darkened theatre without any distress. In other words, the light intensity of the spot of light upon the work sheets on the area 3 should not be materially greater than the light intensity of a normal motion picture screen during exhibition of pictures thereon. The narrow slot formed in the screen should result in a narrow bright line in the center of the illuminated spot thrown by the projector upon the work area 3, such slot thereby acting as an illuminated cross-hair. It is to be understood that instead of an illuminated index, the index projected upon the work area may be a dark line or dark cross-hair.

The projection axes of the projectors 31 are displaced with respect to the axis of the pointer or scribe 22 and when such scribe or pointer 22 is in its normal position of rest in the center of the work area 2, each projector 31 should cast its illuminated spot and cross-hair onto the center of its corresponding work area 3, 4, or the like. Since the work areas 2, 3, 4, etc., lie in planes tangent to a common cylinder, any movement of the scribe or pointer 22 is immediately transferred to the projectors 31 and the position of the projected cross-hair on the work area 3 corresponds exactly to the position of the scribe point on the work area 2 without any appreciable distortion.

In the event the frame 5 is made of tubular material, it may act as a conduit for all necessary electrical connections leading to the various projectors 31.

When in actual use, a master musical score is fitted onto the holding rings 14 and 15 on the work table 2, this master musical score indicating the precise location in footage, tempo, or the like of all dialog, sound effects, music, etc., which comprise the audible portions of a photoplay program. Unmarked or individual musical scores are then placed upon the holding means 16 and 17 of the work areas 3, 4, and the like. A predetermined sound track channel is then connected to the equipment panel 20 of each of the stations or work areas of the device. The operator at a given work area thus becomes responsible for the sounds carried by the particular sound track channels passing through his station or panel. In most instances, the photoplay is then projected upon the screen (within view of the operators sitting at the table described herein) and the various sound tracks are simultaneously reproduced. The operator in charge of the master musical score moves the scribe 22 along the score exposed on the work area 2 in time with the projection of the photoplay and the reproduction of the various sounds over the various sound tracks. As this operator moves the scribe 22, the various projectors 31 cast their cross-hairs of light upon the music scores before the other operators at the work areas 3, 4 and the like. In this manner, all of the operators are simultaneously informed as to the precise location in terms of musical score of any sound effect, dialog or music which is being reproduced. If, for example, an operator is sitting before the work panel 3 and the dialog channels are being reproduced through his panel 20, he listens to the dialog as it is reproduced and notes on his music or cue sheets the precise location at which changes in volume should be made; he also notes the locations (as indicated by the moving slit of light thrown by the projector 31) at which it may be desirable to emphasize the lower or higher frequencies of the voice being reproduced. Similar operations are simultaneously performed by other operators at other work areas so that one, two, three, four, five, six or any number of separate sound channels or tracks may be simultaneously considered, modified and modulated by a plurality of operators all kept fully advised as to the precise location of their suggested changes by the moving spots of light, said spots of light being guided by the operator manipulating the pointer or scribe 22.

It will be noted that each operator is provided with an instrument panel 20 containing suitable controls whereby he may at his option change the characteristics, amplitude or modulation of the particular sound channel passing through his panel.

After one or two rehearsals, the operators may have noted their cues and are now ready for a rerecording of the various sound tracks upon one or more master tracks. During such rerecording, the original sound tracks are again reproduced, each track passing through an operator's control panel. A part of the output is reproduced through loud speakers for the purpose of permitting the operators to hear what effect they are obtaining by their manipulation of the various attenuating devices, futzers, etc., embodied in the panels 20.

The rest of the output from the panels 20 leads into one or more master channels running to recording devices in which one or more master records or recordings are made of the now modulated or changed sound recordings. In such final rerecording session, the operators at the various work areas time themselves in the operation of the various controls in accordance with the previously noted cues which they have made upon their individual music sheets, the precise instant at which a change of controls need be made being definitely indicated by the coincidence of the projected cross-hair of light with a previously noted cue mark on such music sheet.

It is to be understood that various sound channel modulating means (instead of attenuators) may be built into the tables. A sound recording machine can be connected to the individual attenuators or channel modulating means or such modulating means may be part of a combining network leading to a recording machine.

The arrangement hereindescribed permits the work of two or more critics, sound recording engineers, musicians, directors and the like to be effectively and rapidly correlated, the end result, whether a recording or a reproduction of sound, properly blending and combining the work of each of the persons involved.

Although a particular form of apparatus has been described in detail, it will be understood that numerous changes, modifications and adaptations may be made, and all changes coming within the scope of the appended claims are embraced thereby.

We claim:

1. An apparatus for scoring and re-recording sound, comprising: a work table provided with work areas occupying planes inclined to each other, a supporting frame having a body portion parallel to and above the surface of said table, a pointer pivotally suspended from said overhead frame above one of said work areas, a parallel linkage connected to said pointer and extending parallel to said frame above said table, a projector carried by the parallel linkage, said projector being positioned immediately above another of said work areas, variable attenuation means positioned in said table and adjacent to said work areas, and a sound channel operably connected to said attenuation means.

2. An apparatus for scoring and re-recording sound, comprising: a work table provided with a plurality of work areas, variable attenuation means positioned in said table adjacent said work areas, a separate sound channel operably connected to each of said attenuation means, a supporting frame having a body portion parallel to and above the surface of said table, a pointer pivotally suspended from said overhead frame immediately above one of said work areas, a parallel linkage connected to said pointer and extending parallel to said frame above said table, and a plurality of projectors carried by the parallel linkage, one of said projectors being positioned immediately above each work area.

3. An apparatus for scoring and re-recording sound, comprising: a work table provided with a plurality of work areas occupying planes inclined to each other, variable attenuation means positioned in said table adjacent said work areas, a separate sound channel operably connected to each of said attenuation means, a supporting frame pivotally attached to the ends of said table and having a body portion parallel to and above the surface of said table, a pointer pivotally suspended from said overhead frame immediately above one of said work areas, a parallel linkage connected to said pointer and extending parallel to said frame above said table, and a plurality of projectors carried by the parallel linkage, one of said projectors being positioned immediately above each work area, said work areas lying in planes tangent to the axis of suspension of said pointer and projectors.

4. An apparatus for scoring and re-recording sound, comprising: a work table provided with a plurality of work areas, variable attenuation means positioned in said table adjacent said work areas, a separate sound channel operably connected to each of said attenuation means, a supporting frame having a body portion parallel to and above the surface of said table, a pointer pivotally suspended from said overhead frame immediately above one of said work areas, a parallel linkage connected to said pointer and extending parallel to said frame above said table, and a plurality of projectors carried by the parallel linkage, one of said projectors being positioned immediately above each work area, each of said projectors being provided with means adapted to dimly illuminate a portion of its corresponding work area and to project a narrow index thereon.

5. An apparatus for scoring and re-recording sound, comprising: a work table provided with a plurality of work areas occupying planes inclined to each other, variable attenuation means positioned in said table adjacent said work areas, a separate sound channel operably connected to each of said attenuation means, a supporting frame pivotally attached to the ends of said table and having a body portion parallel to and above the surface of said table, a pointer pivotally suspended from said overhead frame immediately above one of said work areas, a parallel linkage connected to said pointer and extending parallel to said frame above said table, and a plurality of projectors carried by the parallel linkage, one of said projectors being positioned immediately above each work area, said work areas lying in planes tangent to the axis of suspension of said pointer and projectors, each of said projectors being provided with means adapted to dimly illuminate a portion of its corresponding work area and to project a narrow index thereon.

6. In an apparatus of the character described, the combination of: a work table provided with a horizontal work area and a plurality of inclined work areas, variable attenuation means positioned in said table adjacent to said inclined work areas, a sound channel operably connected to each side of said attenuation means, holding means mounted in each of said work areas, a supporting frame having a body portion parallel to and above the surface of said table, a pointer pivotally suspended from said overhead frame immediately above the horizontal work area, a parallel linkage connected to said pointer, and a plurality of projectors carried by the parallel linkage, each of said projectors being positioned immediately above one of said inclined work areas.

7. In an apparatus of the character described, the combination of: a work table provided with a horizontal work area and a plurality of inclined work areas, variable attenuation means positioned in said table adjacent to said inclined work areas, a sound channel operably connected to each of said attenuation means, holding means mounted in each of said work areas, a supporting frame having a body portion parallel to and above the surface of said table, a pointer pivotally suspended from said overhead frame immediately above the horizontal work area, a parallel linkage connected to said pointer, and a plurality of projectors carried by the parallel linkage, each of said projectors being positioned immediately above one of said inclined work areas, said horizontal and inclined work areas lying in planes tangent to the axis of suspension of said pointer and projectors.

8. In an apparatus of the character described, the combination of: a work table provided with a horizontal work area and a plurality of inclined work areas, variable attenuation means positioned in said table adjacent to said inclined work areas, a sound channel operably connected to each of said attenuation means, holding means mounted in each of said work areas, a supporting frame having a body portion parallel to and above the surface of said table, a pointer pivotally suspended from said overhead frame immediately above the horizontal work area, said pointer being yieldingly extensible and provided with an inclined lower portion terminating substantially in the extension of the axis of the pointer, a parallel linkage connected to said pointer, and a plurality of projectors carried by the parallel linkage, each of said projectors being positioned immediately above one of said inclined work areas.

9. An apparatus for scoring and rerecording sound, comprising: a work table provided with a plurality of work areas, a sound channel connected to a part at least of said work areas; sound channel modulating means positioned in said table adjacent such work areas to which a sound channel is connected; a supporting frame having a body portion parallel to and above the surface of said table, a pointer pivotally suspended from said overhead frame immediately above one of said work areas, a parallel linkage connected to said pointer and extending parallel to said frame above said table, and a plurality of index means carried by the parallel linkage, one of said index means being positioned immediately above each working area.

10. An apparatus for scoring and rerecording sound, comprising: a work table provided with a plurality of work areas, a sound channel connected to a part at least of said work areas; sound channel modulating means positioned in said table adjacent such work areas to which a sound channel is connected; a supporting frame having a body portion parallel to and above the surface of said table, a pointer pivotally suspended from said overhead frame immediately above one of said work areas, a parallel linkage connected to said pointer and extending parallel to said frame above said table, and a plurality of projectors carried by the parallel linkage, one of said projectors being positioned immediately above each work area, each of said projectors being provided with means adapted to dimly illuminate a portion of its corresponding work area and to project a narrow index thereon.

WILLIAM E. GARITY.
JACKSON G. KUHN.